United States Patent
Makinson et al.

(10) Patent No.: US 8,820,069 B2
(45) Date of Patent: Sep. 2, 2014

(54) SHAPE MEMORY ALLOY TRIGGER FOR PRESSURE RELIEF VALVE

(75) Inventors: John D. Makinson, Lincoln, NE (US); John A. Eihusen, Lincoln, NE (US)

(73) Assignee: Hexagon Technology AS, Alesund (NO)

( * ) Notice: Subject to any disclaimer, the term of this patent is extended or adjusted under 35 U.S.C. 154(b) by 0 days.

(21) Appl. No.: 13/254,346

(22) PCT Filed: Mar. 3, 2010

(86) PCT No.: PCT/US2010/026009
§ 371 (c)(1),
(2), (4) Date: Oct. 4, 2011

(87) PCT Pub. No.: WO2010/101976
PCT Pub. Date: Sep. 10, 2010

(65) Prior Publication Data
US 2012/0011843 A1    Jan. 19, 2012

Related U.S. Application Data

(60) Provisional application No. 61/156,900, filed on Mar. 3, 2009.

(51) Int. Cl.
*F01B 29/10* (2006.01)
*F17C 13/12* (2006.01)
*F16K 17/38* (2006.01)
*F16K 31/00* (2006.01)

(52) U.S. Cl.
CPC .............. *F16K 17/386* (2013.01); *F17C 13/12* (2013.01); *F17C 2260/023* (2013.01); *Y02E 60/321* (2013.01); *F17C 2203/0621* (2013.01); *F17C 2205/0332* (2013.01); *F17C 2250/0439* (2013.01); *F17C 2205/0391* (2013.01); *F17C 2205/0305* (2013.01); *F17C 2205/0382* (2013.01); *F16K 31/002* (2013.01); *F17C 2201/0109* (2013.01)
USPC .................................. 60/527; 60/528; 60/529

(58) Field of Classification Search
USPC ............ 60/527; 137/875, 514.3, 426; 251/31, 251/298
See application file for complete search history.

(56) References Cited

U.S. PATENT DOCUMENTS 3,489,309 A   1/1970   Berman
3,613,732 A   10/1971  Willson
(Continued)

FOREIGN PATENT DOCUMENTS

FR   2796701         1/2001
FR   2796701 A1 *    1/2001
(Continued)

OTHER PUBLICATIONS

Machine Translation in English Language of French Publication No. FR 2796701 A1 is attached.*
(Continued)

*Primary Examiner* — Thomas Denion
*Assistant Examiner* — Shafiq Mian
(74) *Attorney, Agent, or Firm* — James L. Young; Westman, Champlin & Koehler, P.A.

(57) ABSTRACT

This disclosure describes an apparatus having a valve and an elongated shape memory alloy element. The valve has a lever in a first position, whereby the valve is closed. The elongated shape memory alloy element has a first end connected to the lever. The shape memory alloy element has been strained to have a first length, wherein exposure of at least a portion of the shape memory alloy element to a temperature at or exceeding its austenite transformation temperature causes the shape memory alloy element to shorten to a second length, the second length being less than the first length, thereby causing the first end of the shape memory alloy element to pull the lever to a second position, whereby the valve is opened.

13 Claims, 4 Drawing Sheets

(56) References Cited

U.S. PATENT DOCUMENTS

| | | | |
|---|---|---|---|
| 3,914,991 A | | 10/1975 | Fletcher |
| 4,199,994 A | | 4/1980 | Beine |
| 4,284,235 A | * | 8/1981 | Diermayer et al. ............ 236/1 G |
| 4,570,851 A | | 2/1986 | Cirillo |
| 4,699,314 A | * | 10/1987 | Faurie ............................ 236/49.5 |
| 4,840,346 A | * | 6/1989 | Adnyana et al. ................ 251/1.3 |
| 4,884,780 A | | 12/1989 | Ohashi |
| 4,965,545 A | * | 10/1990 | Johnson ............................ 337/140 |
| 4,973,024 A | * | 11/1990 | Homma ............................ 251/11 |
| 5,165,450 A | * | 11/1992 | Marrelli .......................... 137/875 |
| 5,211,371 A | * | 5/1993 | Coffee .............................. 251/11 |
| 5,277,028 A | | 1/1994 | Worner |
| 5,429,267 A | * | 7/1995 | San ................................... 220/581 |
| 5,462,226 A | * | 10/1995 | Randall et al. ............... 236/93 R |
| 5,518,140 A | | 5/1996 | Lenz |
| 5,522,428 A | | 6/1996 | Duvall |
| 5,586,722 A | | 12/1996 | Murray |
| 5,662,139 A | * | 9/1997 | Lish ............................... 137/523 |
| 5,788,212 A | | 8/1998 | Hackman |
| 5,865,418 A | * | 2/1999 | Nakayama et al. .............. 251/11 |
| 6,269,830 B1 | | 8/2001 | Ingle |
| 6,732,516 B2 | | 5/2004 | Butera et al. |
| 6,851,260 B2 | * | 2/2005 | Mernøe ............................ 60/527 |
| 6,955,187 B1 | * | 10/2005 | Johnson ................... 137/625.33 |
| 7,182,101 B2 | * | 2/2007 | Alacqua et al. ................ 137/875 |
| 7,744,059 B2 | * | 6/2010 | Jerg ................................. 251/11 |
| 7,815,161 B2 | * | 10/2010 | Saitoh et al. .................... 251/11 |
| 2004/0129315 A1 | | 7/2004 | Dario |
| 2005/0011563 A1 | * | 1/2005 | Alacqua et al. ................ 137/875 |
| 2007/0277877 A1 | * | 12/2007 | Ghorbal et al. ................. 137/67 |
| 2008/0148853 A1 | | 6/2008 | Kim |
| 2008/0319688 A1 | | 12/2008 | Kim |
| 2013/0167377 A1 | * | 7/2013 | Gillespie .................. 29/890.124 |

FOREIGN PATENT DOCUMENTS

| | | |
|---|---|---|
| JP | 58 132273 | 9/1983 |
| JP | 61 121341 | 7/1986 |
| JP | S61183417 U1 | 11/1986 |
| JP | S62129487 A | 8/1987 |
| JP | 63 162265 | 10/1988 |
| JP | 3065038 U | 1/2000 |
| JP | 2005533956 A | 11/2005 |
| RU | 2188683 | 9/2002 |
| WO | 2004/009995 A1 | 1/2004 |

OTHER PUBLICATIONS

First Office Action, State Intellectual Property Office of People's Republic of China, dated Sep. 26, 2012, from Chinese Patent Application No. 201080010269.8 (12 pages).

International Search Report from corresponding PCT Application No. PCT/US2010/026009, 3 pages (May 31, 2010).

Written Opinion of the International Searching Authority from corresponding PCT Application No. PCT/US2010/026009, 5 pages (May 31, 2010).

First Office Action from the European Patent Office dated Mar. 1, 2013 for corresponding European Patent Application No. 10707757.0, filed Mar. 3, 2010, 2 pages.

Second Office Action, State Intellectual Property Office of People's Republic of China, dated Mar. 7, 2013, from Chinese Patent Application No. 201080010269.8 (13 pages).

Decision on Grant issued in the corresponding Russian Patent Application No. 2011139966/06 (9 pages).

Japanese Notice of Reasons for Rejection and English Translation dated Jan. 28, 2014 for corresponding Japanese Patent Application No. 2011-553064, filed Mar. 3, 2010.

* cited by examiner

US 8,820,069 B2

SHAPE MEMORY ALLOY TRIGGER FOR PRESSURE RELIEF VALVE

CROSS-REFERENCE TO RELATED APPLICATION

This Application is a Section 371 National Stage Application of International Application No. PCT/US2010/026009 filed Mar. 3, 2010 and published as WO 2010/101976 on Sep. 10, 2010, in English, which was a non-provisional of U.S. Provisional Patent Application No. 61/156,900, filed on Mar. 3, 2009.

BACKGROUND

Pressure vessels are commonly used for containing a variety of fluids under pressure, such as storing hydrogen, oxygen, natural gas, nitrogen, propane and other fuels, for example. Suitable container materials include laminated layers of wound fiberglass filaments or other synthetic filaments bonded together by a thermosetting or thermoplastic resin. A polymeric or other non-metal resilient liner or bladder often is disposed within the composite shell to seal the vessel and prevent internal fluids from contacting the composite material. The composite construction of the vessels provides numerous advantages such as lightness in weight and resistance to corrosion, fatigue and catastrophic failure. These attributes are due to the high specific strengths of the reinforcing fibers or filaments that are typically oriented in the direction of the principal forces in the construction of the pressure vessels.

FIGS. 1 and 2 illustrate an elongated pressure vessel 10, such as that disclosed in U.S. Pat. No. 5,476,189, which is hereby incorporated by reference. Vessel 10 has a main body section 12 with end sections 14. A boss 16, typically constructed of aluminum, is provided at one or both ends of the vessel 10 to provide a port for communicating with the interior of the vessel 10. The vessel 10 is formed from an inner polymer liner 20 covered by an outer composite shell 18. In this case, "composite" means a fiber reinforced resin matrix material, such as a filament wound or laminated structure. The composite shell 18 resolves all structural loads and liner 20 provides a gas barrier.

When a pressure vessel is exposed to intense heat, as in the case of a fire, the heat increases the pressure of the gas in the vessel. In a typical steel vessel, one or more rupture discs are provided in a valve body at the end port of the vessel. These discs react to the pressure increase to release gas before the tank ruptures.

In the case of a composite vessel, however, the composite does not heat like steel and thus the pressure does not rise in the tank in the same manner (so that a pressure release valve actuated by an increase in pressure is not appropriate). However, upon continued exposure to heat, the pressure in the composite vessel increasex, ultimately causing a rupture, thereby resulting in an uncontrolled release of gas and/or an explosion.

In the prior art, a plurality of temperature sensors are positioned at discrete locations along a tank. Such sensors are operably coupled to one or more pressure relief valves for the tank. Such coupling may be accomplished electrically, chemically, mechanically, or by a pressurized line. In an example, a plurality of discrete sensors are fastened into a pressurized tubing that runs along the outside of the tank. However, some authorities regulating the transportation of certain goods (e.g., high pressure gas) discourage the use of lines or manifolds that are pressurized during transportation. Moreover, the use of sensors positioned at discrete locations on a tank leaves portions of the tank that are free from sensor coverage.

SUMMARY

This disclosure describes an apparatus comprising a valve and an elongated shape memory alloy element. The valve comprises a lever in a first position, whereby the valve is closed. The elongated shape memory alloy element has a first end connected to the lever. The shape memory alloy element has been strained to have a first length, wherein exposure of at least a portion of the shape memory alloy element to a temperature at or exceeding its austenite transformation temperature causes the shape memory alloy element to shorten to a second length, the second length being less than the first length, thereby causing the first end of the shape memory alloy element to pull the lever to a second position, whereby the valve is opened.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

DETAILED DESCRIPTION

Figure 1:
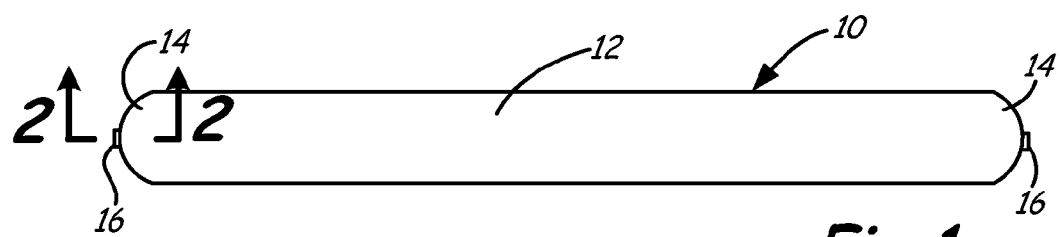
FIG. 1 is a side elevation view of a typical elongated pressure vessel.
Figure 2:
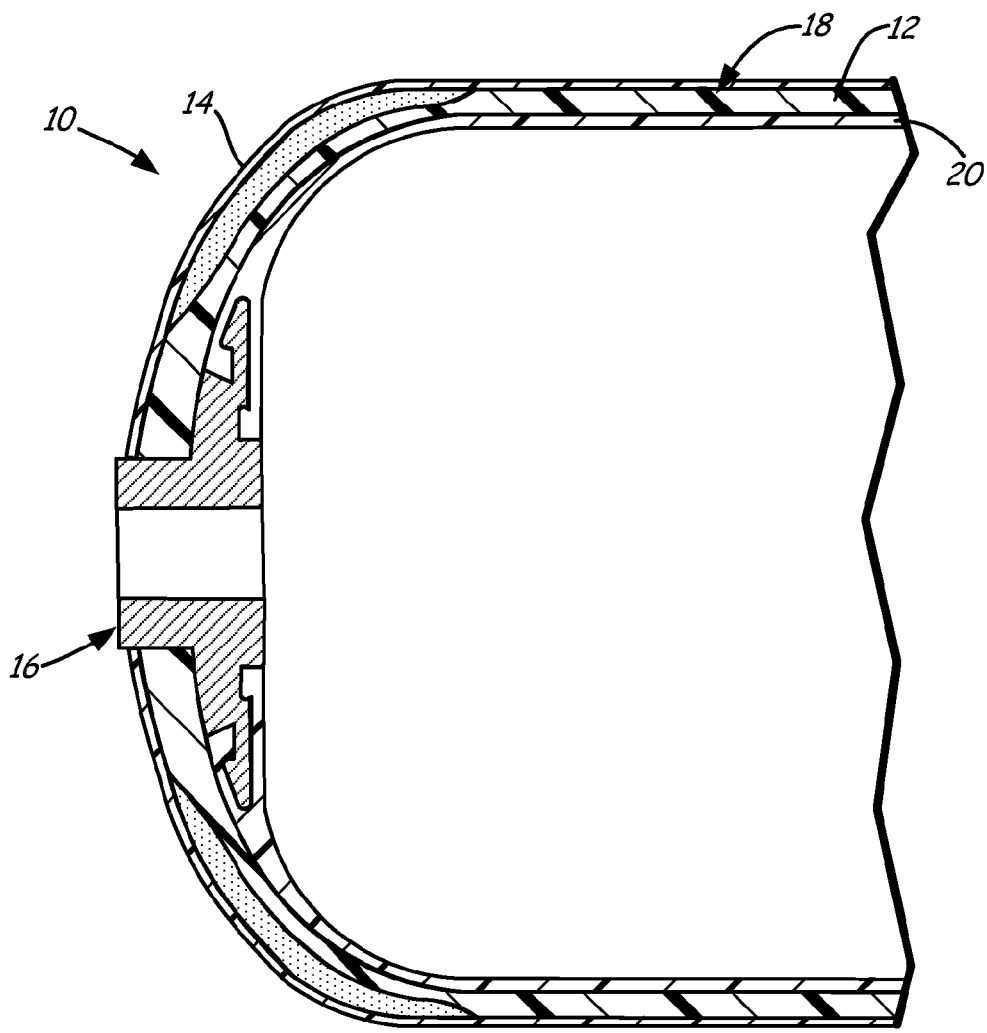
FIG. 2 is a partial cross-sectional view through one end of such a pressure vessel, taken along line 2-2 of FIG. 1.
Figure 3:
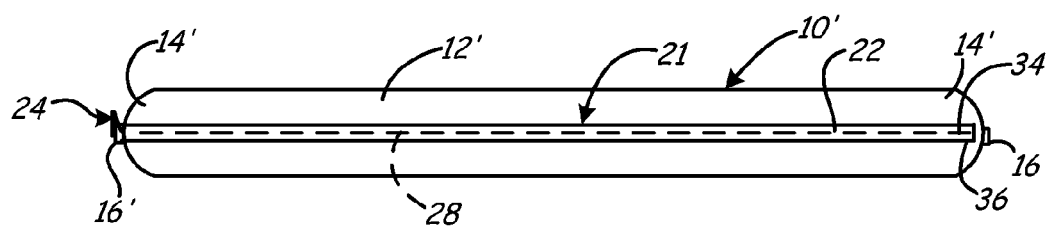
FIG. 3 is a side elevation view of an elongated pressure vessel incorporating an exemplary shape memory alloy trigger for a pressure relief valve of the present disclosure.

This disclosure provides a sensor and valve assembly for controlled depressurization of a pressure vessel, such as a composite cylindrical gas storage vessel, in particular when the vessel is exposed to a fire. The present disclosure provides a temperature activated sensor and valve assembly 21 for releasing gas from within the vessel, rather than relieving excess gas using a valve based upon pressure. As illustrated in FIG. 3, a piece of tubing 22 is mounted on the outside of the pressure vessel 10' to run along the length of vessel 10'. In an exemplary embodiment, tubing 22 is made of stainless steel and has an outside diameter of 0.25 inch. In an exemplary embodiment, tubing 22 has perforations 40 (shown in FIG. 4C) to allow freer heat flow into tubing 22. Pressure relief or release valve (PRV) 24 is mounted on boss 16' near first end 26 of tubing 22 (see FIG. 4A).

An elongated shape memory alloy (SMA) element, such as wire 28, is 'set' by straining (stretching of wire 28) approximately 10%. This straining is achieved at a temperature below the SMA's austenite start temperature. The strained wire 28 is threaded inside tubing 22, which is fixed relative to a lever 32 of PRV 24. A first end 30 of the wire 28 is attached to lever 32 of PRV 24. A second end 34 of wire 28 is fixed relative to tubing 22, such as by being attached to a second end 36 of tubing 22 (such as by a mechanical fastener or by swaging the second end 36 of the tubing 22 over the second end 34 of wire 28). In an exemplary embodiment, second end 34 of wire 28 is positionally fixed relative to pressure vessel 10'.

Figure 4A:
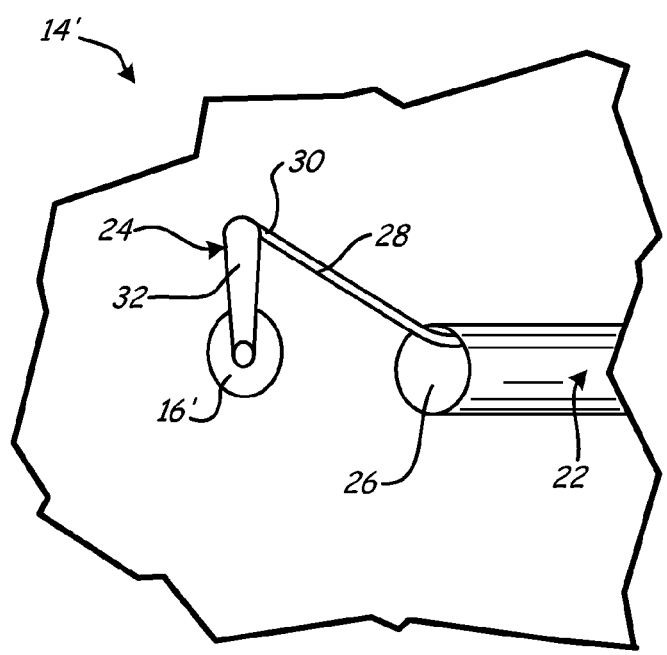
FIG. 4A is a schematic view of a portion of an end section of the pressure vessel of FIG. 3, with the pressure relief valve in a closed position.
Figure 4B:
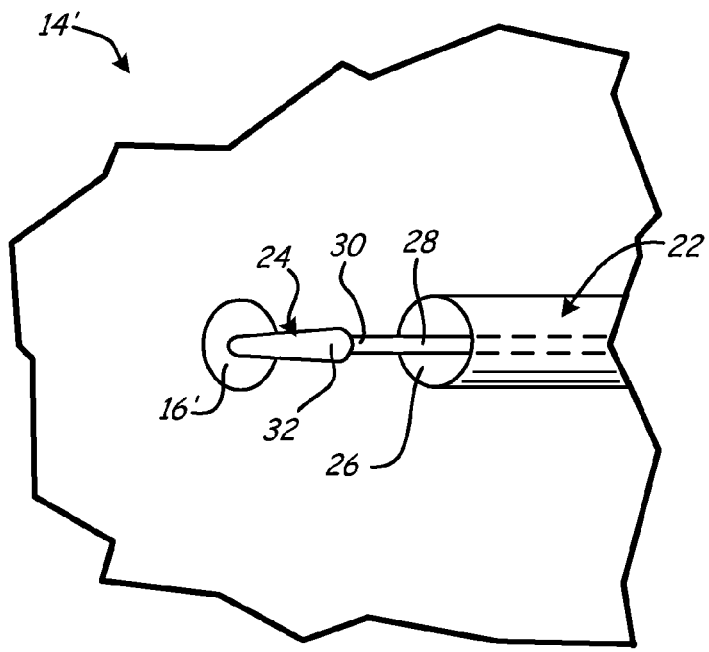
FIG. 4B is a schematic view of a portion of an end section of the pressure vessel of FIG. 3, with the pressure relief valve in a first open position.
Figure 4C:
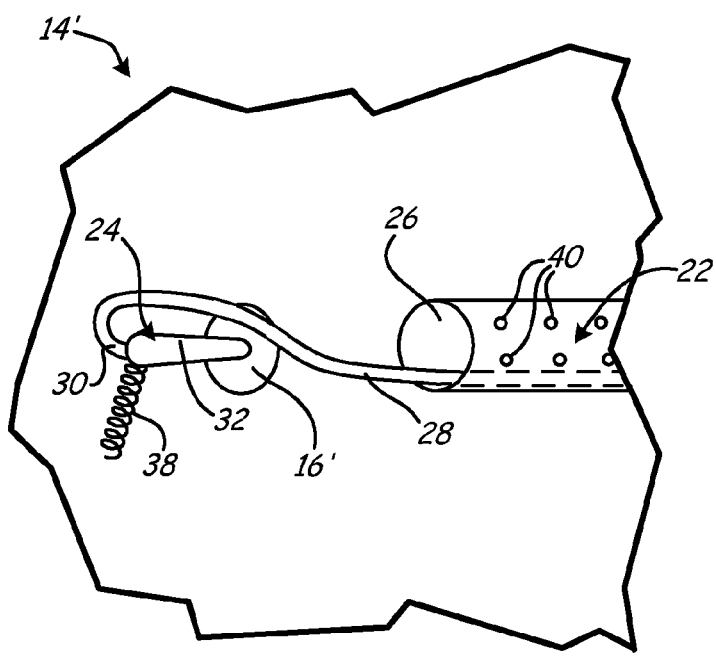
FIG. 4C is a schematic view of a portion of an end section of the pressure vessel of FIG. 3, with the pressure relief valve in a second open position.

In an exemplary embodiment, PRV 24 is a conventional quarter-turn valve. FIG. 4A shows PRV 24 in a closed position, wherein lever 32 is in a vertical position. With such a conventional quarter-turn valve, rotating lever 32 about ninety degrees (to the positions shown in FIG. 4B or 4C) opens the valve, thereby allowing gas to escape from boss 16'.

In an exemplary embodiment, heating of wire 28 to or beyond its austenite transformation temperature causes the wire 28 to shrink by 6-8%. Thus, for each foot of wire transformed, the strain recovered by wire 28 causes it to shorten by 0.72 to 0.96 inch. As it shortens, first end 30 pulls with a force of approximately 120 pounds (for a wire diameter of 0.06 inch) and thereby turns lever 32 to open PRV 24. In an exemplary embodiment, the disclosed trigger is designed so that exposure of a requisite portion of the vessel 10' to or in excess of the transformation temperature of wire 28 causes a shortening of wire 28 that is adequate to pull lever 32 to the open position illustrated in FIG. 4B. In an exemplary embodiment, PRV 24 is designed to trigger with a total wire 28 shrinkage of 1 inch. While end 30 of wire 28 is attached to an end of lever 32 in the illustrated embodiments, wire 28 can be attached to lever 32 at another location, as appropriate for a particular application, taking into account the displacement and pulling force required to open PRV 24.

The heat for triggering sensor and valve assembly 21 can be present anywhere along the length of the SMA wire 28. In an exemplary embodiment, SMA wire 28 is run in a substantially straight line parallel to the vessel surface along substantially the entire length of vessel 10', thereby protecting the pressure vessel 10' over its entire length. In other embodiments, tubing 22 and wire 28 are run to additional locations where a fire or elevated temperature might be detected. If any portion of the wire 28 is heated past an established temperature, the wire will shrink by a certain degree. If enough of the wire 28 shrinks, movement of the end 30 of wire 28 pulls on lever 32 to open PRV 24. With PRV 24 thus opened, pressurized gas from within the vessel 10' can escape through the open PRV 24 in a controlled manner.

Accordingly, SMA wire 28 acts as a temperature sensor along the entire length of the vessel 10' and can thus react to localized fires to allow release of gas from vessel 10'. The disclosed trigger arrangement can be used to protect a vessel of any length, even very long pressure vessels. More than one tubing 22 and wire 28 can be used on a single valve 24. The tubing 22 and wire 28 are not limited to straight runs, but can be bent, so long as the wire 28 is moveable within the tubing 22. For example, SMA wire 28 laid in a spiral configuration from one end of the tank to the other offers protection on all sides of the tank as well as protection for the length of the tank. The tubing 22 protects the sensor wire 28 from environmental conditions that might adversely affect its performance. This arrangement results in a relatively inexpensive sensor assembly 21. The disclosed sensor assembly 21 minimizes false triggering, since the PRV 24 will only be triggered when the wire 28 is exposed to a temperature that exceeds the austenite transformation temperature. The transformation temperature is determined by the wire alloy composition. In one exemplary embodiment, the alloy is 54.79 weight percent Nickel and 45.21 weight percent Titanium and has a transformation temperature of 100° C. (212° F.). The amount of force can be controlled by selecting the cross-section area (e.g., diameter) of the shape memory element or wire 28. An exemplary wire having a diameter of about 0.06 inch produces approximately 120 pounds of pull once the ambient temperature exceeds the transformation temperature of the particular alloy. More force is accomplished with a wire having a larger cross-sectional area. The force developed is essentially independent of length and temperature; thus, higher temperatures or more heat input will not significantly increase or decrease the force developed due to transformation. Once sensor assembly 21 is put in place, it is essentially maintenance free for the life of the pressure vessel 10'. The shape memory wire 28 is essentially under no stress until transformation occurs.

The pressure release device can also be set to be triggered if the wire 28 is severed. In an exemplary embodiment, lever 32 is biased (such as by spring 38) in the direction shown in FIG. 4C, which is offset from the "off" position of FIG. 4A by a rotational angle of about 90 degrees (in the direction opposite the offset between the "off" and "on" positions shown in FIGS. 4A and 4B, respectively). Thus, if wire 28 is severed and no longer exerts a pulling force on lever 32, lever 32 automatically springs into the position illustrated in FIG. 4C, thereby opening PRV 24.

Figure 5:
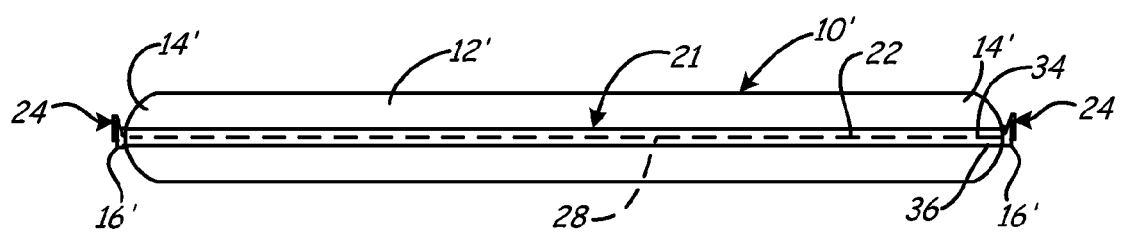
FIG. 5 is a side elevation view of an elongated pressure vessel incorporating an exemplary shape memory alloy trigger connected to a pressure relief valve at each end of the vessel.

In another exemplary embodiment, illustrated in FIG. 5, second end 34 is wire 28 is attached to the lever of a second PRV. This would allow two PRV's to activate, venting the vessel 10' from both ends 14'. In yet another embodiment, the disclosed tubing and SMA valve and sensor assembly 21 can be used to actuate any device (not just a PRV) such as, for example, a fire suppression system.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa.

What is claimed is:

1. An apparatus comprising:
    a valve comprising a lever in a first position, the valve being closed at the first position;
    an elongated shape memory alloy element having a first end connected to the lever,
    wherein the shape memory alloy element has been strained to have a first length, wherein exposure of at least a portion of the shape memory alloy element to a temperature at or exceeding its austenite transformation temperature causes the shape memory alloy element to shorten to a second length, the second length being less than the first length which causes the first end of the shape memory alloy element to pull the lever to a second position,
    wherein the first position of the lever and the second position of the lever are different, and the valve being open at the second position; and
    a biasing element that biases the lever to a third position, wherein the third position of the lever is different than the first and the second positions of the lever, and the valve being open at the third position of the lever upon severance of the elongated shape memory alloy element such that the elongated shape memory alloy element does not exert a pulling force on the lever.

2. The apparatus of claim 1 wherein the valve is a pressure release valve.

3. The apparatus of claim 1 disposed on a pressure vessel.

4. The apparatus of claim 1 wherein the valve is a quarter-turn valve.

5. The apparatus of claim 1 further comprising a tube within which at least a portion of the shape memory alloy element is disposed.

6. The apparatus of claim 1 wherein the shape memory alloy element has a second end that is positionally fixed.

7. The apparatus of claim 1 wherein the shape memory alloy element has a second end that is connected to a second lever of a second valve.

8. The apparatus of claim 1 wherein the first position of the lever and the second position of the lever are offset by a rotational angle of about 90 degrees.

9. The apparatus of claim 1 wherein the third position is offset from the first position by a rotational angle of about 90 degrees in a rotation direction opposite that of the offset between the first position of the lever and the second position of the lever.

10. The apparatus of claim 1 wherein the biasing element is a spring.

11. The apparatus of claim 3 wherein the valve is mounted on a boss of the pressure vessel.

12. The apparatus of claim 3 wherein the elongated shape memory alloy element is positioned along a length of the pressure vessel.

13. The apparatus of claim 5 wherein the tube comprises a plurality of perforations.

* * * * *